Jan. 22, 1929.
G. F. FEISTER
1,699,695
APPARATUS FOR HALVING CARCASSES
Filed Aug. 10, 1927
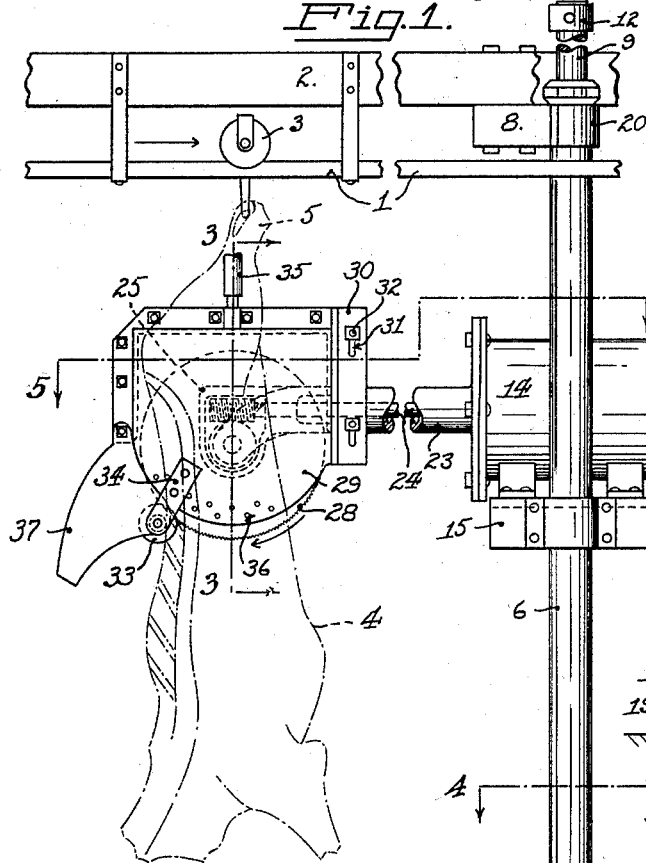
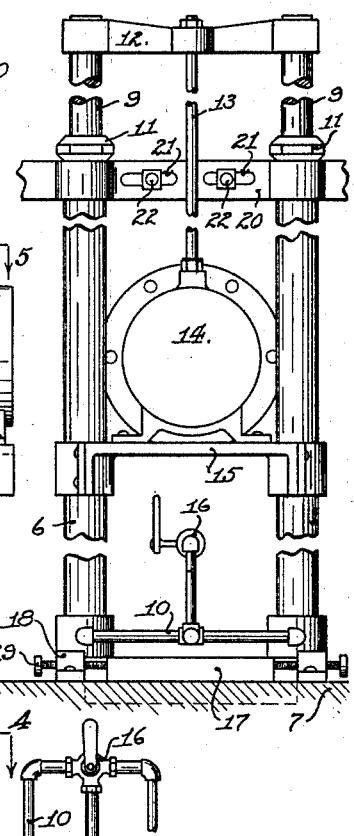
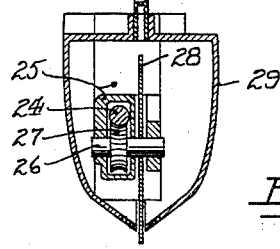
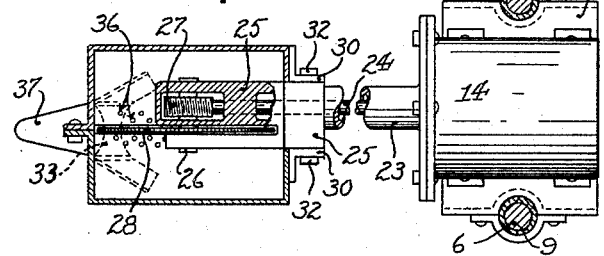
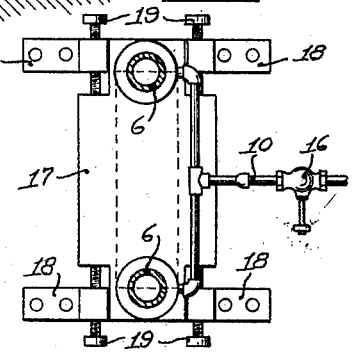
INVENTOR.
George F. Feister
BY
Booth & Booth
ATTORNEYS.

Patented Jan. 22, 1929.

1,699,695

UNITED STATES PATENT OFFICE.

GEORGE F. FEISTER, OF MARICOPA, CALIFORNIA.

APPARATUS FOR HALVING CARCASSES.

Application filed August 10, 1927. Serial No. 211,944.

The present invention relates to an apparatus for splitting or halving the carcasses of beeves or other meat animals.

It is the customary practice in the slaughtering and preparing of animals for the market to suspend the carcass after it has been skinned and eviscerated by the hind legs from a pair of laterally separated trolleys travelling upon overhead rails, and while so suspended to halve the carcass by splitting it longitudinally down the middle of the backbone or chine. This splitting operation is ordinarily done by hand with an ax, and requires a very high degree of skill and accuracy, because if the cut is not in the exact longitudinal center of the chine, a greater or less proportion of bone will be left on one or the other halves of the carcass, and the market value of the individual halves will be thereby affected.

The principal object of my present invention is to provide a mechanical device for halving or splitting carcasses with extreme accuracy and with greater speed than is possible by hand, and to provide such a device which can be successfully used by an unskilled or semi-skilled operative. Another object of the invention is to provide a device of the character described which can be readily installed without changing the existing equipment of the packing-house. Other objects and advantages of the invention will become apparent from the following description which should be read with the understanding that the construction, form and arrangement of the several parts may be varied within the limits of the claims hereto appended without departing from the spirit of the invention as expressed in said claims.

With this in view, a preferred form of the invention will now be described fully with reference to the accompanying drawings, wherein:—

Fig. 1 is a partly broken side elevation of the machine in operative position.

Fig. 2 is a partly broken rear elevation.

Figs. 3, 4 and 5 are sectional details taken on the respective lines 3—3, 4—4, and 5—5, of Fig. 1.

In the drawings, the reference numeral 1 designates one of the rails or tracks of the trolley mentioned above, and supported by a suitable frame 2. It is understood that there are two such rails parallel and laterally separated in order to spread apart the hind legs of the carcass. Trolleys, one of which is shown at 3, are arranged to travel upon the rails 1 and suspend the carcass indicated at 4 by its hind legs, one of which is shown at 5. So much is the customary equipment of packing-houses. The carcass is thus suspended by its separated hind legs, and is carried along on the rails 1, in the direction of the arrow in Fig. 1, from that portion of the plant in which it has been skinned, split open down the belly and eviscerated, and is now in condition for the operation of halving or splitting down the longitudinal center of the chine.

A pair of transversely spaced tubular columns 6 are firmly mounted upon a base or floor 7, and are braced at their upper ends by a cross piece 8 secured to the frame 2. A pair of pistons or plungers 9 are mounted within the tubular columns 6, and are adapted to be elevated by fluid pressure introduced into the lower portions of said columns by a pipe 10. The upper ends of the columns 6 are understood to be provided with suitable packing, the nuts therefor being indicated at 11.

The upper ends of the plungers 9 are connected together by a transverse member 12 which is connected by a rod 13 with the frame or housing of a motor 14. The motor 14 is mounted upon a transverse bracket 15 which is slidable upon the columns 6. The pressure fluid for operating the plungers 9 is preferably water taken from the ordinary supply of the plant, and is controlled by a conveniently positioned valve indicated at 16. This valve is understood to be of the usual three-way type, adapted to either admit the water to the columns 6 to raise the plungers 9 and the motor 14, or to hold the pressure within said columns to maintain the motor in an elevated position, or to permit the discharge of the pressure, thereby allowing the plungers 9 and the motor 14 to descend by their own weight. The entire structure above described comprising the columns 6 and the motor 14 is adjustable transversely of the track 1. For this purpose, the columns 6 are mounted in a base 17, Figs. 1, 2 and 4, which is secured between and longitudinally movable in brackets 18 fixed to the floor 7. Adjusting screws 19 are provided in the brackets 18 and are adapted to bear against the opposite ends of the base 17, whereby it may be shifted laterally and firmly secured in any desired position. The upper ends of the columns 6 are adjustably secured to the cross frame member 8 by a clamp 20, Figs. 1 and 2, provided with slots 21 and secured to said frame member 8 by bolts 22 extending through said slots.

The housing of the motor 14 supports a forwardly extending horizontal tube 23, Figs. 1 and 5, surrounding the motor shaft 24. At the forward end of said tube 23 is a housing 25 in which is mounted the transverse saw shaft 26 and suitable worm gearing 27 for transmitting the power from the motor shaft 24 to said saw shaft. A circular saw 28 is mounted upon the saw shaft 26. A guard or casing 29, Figs. 1, 3 and 5, encloses the saw 28. The upper portion of said guard is of sufficient width to enclose the gear housing 25, but its lower edges converge toward the sides of the saw 28, as shown in Fig. 3, allowing a portion of the lower edge of said saw to project below the lower edges of the guard. The edges of said guard are preferably brought as close to the faces of the saw as is practicable.

The guard 29 is supported by the gear housing 25 and is vertically adjustable to enable it to be raised as the diameter of the saw is decreased by successive use and sharpening. For this adjustment, the guard 29 is provided with supporting flanges 30, Figs. 1 and 5, provided with slots 31, and the connection between the gear housing 25 and the guard 28 is made by bolts 32 extending through said slots from the sides of said gear housing.

The columns 6 and the motor 14 are so positioned with respect to the rails 1 that the saw 28 will cut through the exact longitudinal center of the backbone of the carcass 4 which hangs from said rails 1. To further insure that the saw will cut through the exact center of the backbone, I provide a substantially V-shaped guide roller 33, Figs. 1 and 5, mounted upon brackets 34 extending rearwardly and downwardly from the guard 28, and adapted to ride upon the outside of the backbone of the carcass. This roller, on account of its substantial V-shape, fits the ridge upon the outside of the backbone of the carcass and guides the carcass as the saw descends so that said saw will cut accurately through the longitudinal center of the backbone. The action of the saw, which rotates in the direction of the arrow in Fig. 1, holds the carcass firmly against the roller 33.

In the operation of the device, the motor 14 and its saw 28 are first elevated by fluid pressure introduced into the columns 6 under the plungers 9, and the carcass is brought along the rails 1 until it occupies a position beneath the saw 28 with its hind legs straddling said saw and its guard 29. The saw is then lowered by relieving the pressure within the columns 6, and passes downwardly cutting through the backbone of the carcass, the roller 33 following the outside of said backbone and guiding it accurately to the saw. At the end of the operation, the two separated halves of the carcass are carried along on the rails 1, passing on the outsides of the columns 6.

In order to prevent heating of the bone, I provide means for flushing the saw with water during the cutting operation. For this purpose, a connection 35 is provided through which water is introduced into the interior of the guard 29. Such water escapes partly through the slot through which the saw projects and partly through apertures 36 in the lower portions of the sides of the guard, and flows copiously over the cut surface of the carcass. A V-shaped deflector or splash guard 37, Figs. 1 and 5, prevents the water from splashing or spraying the operator. The effect of this water is not only to prevent heating of the bone but also to wash away the bone chips thereby keeping the surface of the meat and the bone clean and preventing the clogging of the the pores of the bone by such chips. It has been found that the cutting of the bone by high speed saws results in the clogging of the pores of the bone by the chips and dust, and that this clogging promotes spoilage. By my above described means for flushing the cut surfaces of the bone, I prevent the danger of such spoilage.

I claim:—

1. An apparatus for halving carcasses comprising means for holding a carcass; a hollow supporting column; a plunger operating therewithin; a bracket slidably mounted upon said column; a saw carried by said bracket; a connection between said plunger and said bracket for moving the latter; and means for introducing fluid pressure into said column to move said plunger.

2. An apparatus for halving carcasses comprising means for holding a carcass with its longitudinal median line in a substantially vertical plane; a pair of transversely spaced substantially vertical columns; a base common to both said columns; a bracket extending between and movable vertically upon said columns; a saw carried by said bracket; and means for adjusting said base laterally to position said saw in the median line of the carcass.

3. An apparatus for halving carcasses comprising means for holding a carcass; a saw; means for supporting said saw in operative relation to the carcass; a guard surrounding said saw, said guard having a substantially V-shaped cross section with a slot at its apex through which a portion of the saw protrudes; and means for adjustably mounting said guard upon the saw supporting means for varying the extent of protrusion of the saw through said slot.

4. An apparatus for halving carcasses comprising means for holding a carcass; a saw; means for supporting said saw in operative relation to the carcass; a guard surrounding said saw; said guard having a substantially V-shaped cross section and being provided with a slot at its apex through which a portion of the saw protrudes, and with apertures in its walls adjacent to said slot; and means for supplying fluid to the interior of said guard.

5. An apparatus for halving carcasses comprising means for holding a carcass; a pair of transversely spaced supporting columns; plungers operating therewithin; a bracket extending between and slidably mounted upon said columns; connections between said plungers and said bracket for moving the latter; a saw carried by said bracket; and means for introducing fluid pressure into said columns to move said plungers.

In testimony whereof I have signed my name to this specification.

GEORGE F. FEISTER.